W. H. & W. J. CLARK.
WHEEL.
APPLICATION FILED OCT. 29, 1913.

1,097,613.

Patented May 26, 1914.

Witnesses:
Geo Johnson.
M. S. Belden.

William H. Clark
William J. Clark
Inventors
by James W. See
Attorney

UNITED STATES PATENT OFFICE.

WILLIAM H. CLARK AND WILLIAM J. CLARK, OF SALEM, OHIO, ASSIGNORS TO THE W. J. CLARK COMPANY, OF SALEM, OHIO.

WHEEL.

1,097,613.  Specification of Letters Patent.  Patented May 26, 1914.

Application filed October 29, 1913. Serial No. 797,940.

*To all whom it may concern:*

Be it known that we, WILLIAM H. CLARK and WILLIAM J. CLARK, citizens of the United States, residing at Salem, Columbiana county, Ohio, have invented certain new and useful Improvements in Wheels, of which the following is a specification.

This invention relates to wheels and has been aimed particularly at wheels for trucks, though applicable to wheels of such large diameter that they might not be termed truck wheels, and the improvements are applicable to wheels having either metallic or rubber treads.

In sheet-metal wheels for truck purposes, lightness of structure is of importance and this necessarily calls for thin metal in the construction, and thin metal is also desirable by reason of its facility for being struck up into desired form. But while lightness is important, strength is equally so.

Truck wheels running loose on fixed axles are subject to wear at the ends of the hubs, and in some construction such wear, if extended, may result in destroying the integrity of the structure. Our invention provides lightness, strength, economy of structure, and long life.

The invention will be readily understood from the following description taken in connection with the accompanying drawing in which:—

Figure 1:
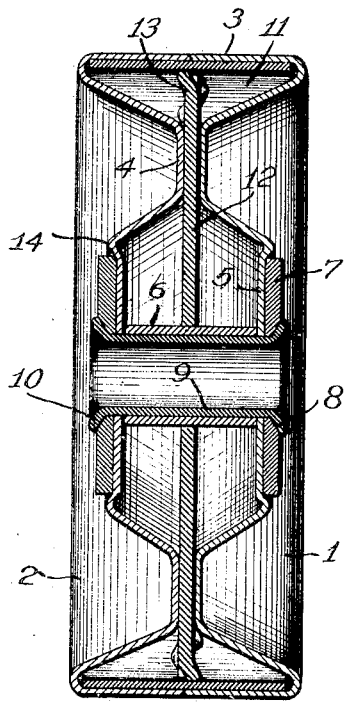
Figure 2:
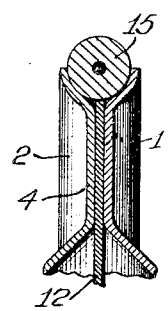
Figure 3:
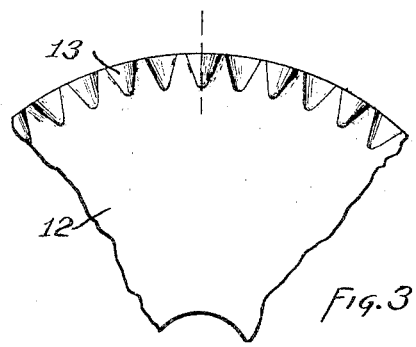
Figure 4:

Figure 1 is a vertical diametrical section of a wheel embodying an exemplification of our invention, the wheel being illustrated as of metallic tread type: Fig. 2 a similar vertical section of a part of the wheel, illustrated as being of rubber tread type, or provided with a rubber tire: Fig. 3 a face view of a portion of the stiffening disk in one of its forms: and Fig. 4 a plan of a portion of the disk illustrated in Fig. 3.

In the drawing, ignoring Fig. 2 for the present:—1, indicates one of the side-halves of the wheel, formed by being struck up of sheet-metal: 2, the second side-half, the two conjoining to form the complete body of the wheel: 3, the tread of the wheel formed by the flanges of the two side-halves: 4, inwardly projecting annular portions of the side-halves at a point between the tread and hub-portions of the wheel, these inwardly projecting portions having flat inner faces presenting toward each other: 5, hub-portions formed by annular flat surfaces at the general central portions of the side-halves, these hub-portions being separated from each other so as to produce a hub of considerable length: 6, a stretcher-tube disposed concentrically between the hub-portions 5: 7, washers, of substantial thickness, disposed against the outer faces of the hub-portions 5 and having bores corresponding with the bore of the stretcher-tube: 8, counterbores or countersinks at the exterior of the bores of the washers: 9, a hub-tube or box fitting tightly within the stretcher-tube, the hub-portions 5, and the washers: 10, upsetting at each end of the box, this upsetting engaging the counterbores or countersinks of the washers and preferably projecting somewhat beyond the outer surfaces of the washers: 11, a ring disposed within the metallic tread 3 of the wheel and in close contact with the interior surface of the tread-flanges of the side-halves: 12, a flat stiffening disk disposed between the two side-halves and fitting flatly against the inner faces of annular portions 4 and having its periphery in close contact with the interior of ring 11, if that ring be employed, this stiffening disk having a central aperture adapted to closely fit the exterior of stretcher-tube 6: 13, a circumferential series of transverse corrugations at the periphery of the stiffening disk: 14, annular projections from the outer surfaces of hub-portions 5 closely engaging the inner peripheral corners of the washers: and 15, (Fig. 2) a rubber tire which may be employed upon the wheel, the outer extremities of the side-halves being suitably formed to receive the tire.

The structure illustrated in Fig. 1 may have the inner edges of the flanges of the two side-halves in mere contact with each other or they may be welded together, as by electric welding process, and the tread formed by these flanges may be employed as a metallic tread or, if desired, it may have a tire of rubber or analogous material applied to it.

Ring 11 greatly strengthens the periphery of the wheel and results in a thick tread while the metal of the side-halves are thin. The side-halves and stretcher-tube and washers having been assembled, box 9 is placed in position and its ends upset, thus binding the parts of the structure together. The upsetting of the ends of the box, to be done under considerable pressure, not only causes the ends of the box to engage the washers so as to forcefully pinch the washers, hub-portions and stretcher-tube together, but the upsetting also forcefully expands the box and causes it to fill the stretcher-tube with extreme tightness, the result being a structure of extreme rigidity and capable of standing the hard punishment incident to the use of wheels on trucks. For extra heavy duty the stiffening disk 12 may be applied and this very much further stiffens the structure radially and laterally. The corrugating of the periphery of the flat stiffening disk increases the extent of bearing between the rim of the disk and ring 11, or between the rim of the disk and tread 3 if ring 11 be not employed, and also transversely stiffens the rim of the disk and provides for a very material increase in the strength of the general structure even if the stiffening disk be made thin.

It will be noted that the upset ends of the box project somewhat beyond the outer faces of the washers. It is these projecting ends which receive the wear due to side thrusts in the use of the wheel, and in the present case the construction is such that the ends of the box may wear even with the outer faces of the washers, and that the outer faces of the washers and ends of the box may wear considerable without releasing the general structure from the binding effect of the upsetting of the box.

We claim:—

1. A metallic wheel comprising, two sheet-metal side-halves provided with flat hub-portions margined by annular projections, a stretcher-tube having its ends engaging the inner surfaces of the hub-portions, washers disposed against the outer surfaces of the hub-portions and having their inner peripheral corners closely engaging within said annular projections, and a box tightly fitting within the bores of the washers, the hub-portions and the stretcher-tube and having its ends upset around the bores of the washers, combined substantially as set forth.

2. A metallic wheel comprising, two sheet-metal side-halves provided with flat hub-portions, a stretcher-tube having its ends engaging the inner surfaces of the hub-portions, counterbored washers disposed against the outer surfaces of the hub-portions, and a box tightly fitting within the bores of the washers, the hub-portions and the stretcher-tube and having its ends upset within the counterbores of the washers, combined substantially as set forth.

3. A metallic wheel comprising, two sheet-metal side-halves provided with flat hub-portions, a stretcher-tube having its ends engaging the inner surfaces of the hub-portions, counterbored washers disposed against the outer surfaces of the hub-portions, and a box tightly fitting within the bores of the washers, the hub-portions and the stretcher-tube and having its ends upset within the counterbores of the washers and projecting beyond the outer faces of the washers, combined substantially as set forth.

4. A metallic wheel comprising, two sheet-metal side-halves having flat annular portions, a tread-portion for the wheel, means for securing the two side-halves together, and a flat stiffening disk disposed between and in contact with the flat annular portions of the side-halves and having its periphery in engagement with the outer portions of the wheel, combined substantially as set forth.

5. A metallic wheel comprising, two sheet-metal side-halves having flat annular portions, means for securing said side-halves to each other, a flat stiffening disk disposed between and in contact with the flat annular portions of the side-halves and having its periphery in engagement with the outer portions of the wheel, and transverse corrugations at the periphery of the stiffening disk, combined substantially as set forth.

WILLIAM H. CLARK.
WILLIAM J. CLARK.

Witnesses:
JOHN E. ROGERS,
J. F. PENROSE.